(12) United States Patent
Lin et al.

(10) Patent No.: US 8,401,948 B2
(45) Date of Patent: *Mar. 19, 2013

(54) METHOD FOR IMPLEMENTING A VIRTUAL COMMUNITY OF INVESTORS HAVING INVESTMENT PORTFOLIOS

(75) Inventors: Daniel Lin, Culver City, CA (US); Lisa R. Pozzi, Los Angeles, CA (US); Brian N. Sawyer, Santa Monica, CA (US); Gordon K. Gustafson, Encino, CA (US); Akber N. Zaidi, Yorba Linda, CA (US)

(73) Assignee: eBay Inc., San Jose, CA (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/173,365

(22) Filed: Jul. 15, 2008

(65) Prior Publication Data

US 2008/0275825 A1     Nov. 6, 2008

Related U.S. Application Data

(63) Continuation of application No. 09/739,565, filed on Dec. 15, 2000, now Pat. No. 7,401,039.

(51) Int. Cl.
*G06Q 40/00* (2006.01)

(52) U.S. Cl. ............ 705/36 R; 705/26; 705/27; 705/35; 705/36; 705/37; 705/38

(58) Field of Classification Search ............... 705/26, 705/27, 35, 36, 37, 38
See application file for complete search history.

(56) References Cited

U.S. PATENT DOCUMENTS

| | | | |
|---|---|---|---|
| 5,778,178 A | 7/1998 | Arunachalum | |
| 5,987,500 A | 11/1999 | Arunachalam | |
| 6,212,556 B1 | 4/2001 | Arunachalam | |
| 6,236,980 B1 | 5/2001 | Reese | |
| 6,275,814 B1 | 8/2001 | Giansante et al. | |
| 6,405,179 B1 | 6/2002 | Rebane | |
| 6,405,204 B1 | 6/2002 | Baker et al. | |
| 6,510,419 B1 | 1/2003 | Gatto | |
| 6,564,191 B1 | 5/2003 | Reddy | |
| 6,601,044 B1* | 7/2003 | Wallman | 705/36 R |
| 6,606,615 B1* | 8/2003 | Jennings et al. | 706/45 |
| 6,792,399 B1* | 9/2004 | Phillips et al. | 705/36 R |
| 6,907,403 B1 | 6/2005 | Klein et al. | |
| 7,016,872 B1* | 3/2006 | Bettis et al. | 705/36 R |
| 7,167,838 B1 | 1/2007 | Gatto | |
| 7,177,831 B1 | 2/2007 | O'Shaughnessy et al. | |
| 7,181,406 B1 | 2/2007 | Modest | |
| 7,249,080 B1 | 7/2007 | Hoffman et al. | |
| 7,373,324 B1* | 5/2008 | Engin et al. | 705/36 R |

(Continued)

OTHER PUBLICATIONS

"U.S. Appl. No. 09/739,565, Advisory Action mailed Sep. 23, 2005", 3 pgs.

(Continued)

*Primary Examiner* — Nga B. Nguyen

(74) *Attorney, Agent, or Firm* — Schwegman Lundberg & Woessner, P.A.

(57) ABSTRACT

A system and method for providing analytical tools for a community of investors having investment portfolios. A first tool provides an indication of a user's selection effectiveness regarding the user's choice of investments relative to those sectors in which the investment resides, and relative to a broader market. A second tool allows the user to evaluate the effectiveness of community stimuli on the user's portfolio. A third tool provides the user the capability to view relationships among a plurality of preferred analysts. With a fourth tool, a user may view a plurality of other analysts the user referred to the community.

20 Claims, 9 Drawing Sheets

U.S. PATENT DOCUMENTS

| | | | |
|---|---|---|---|
| 7,401,039 B1 | 7/2008 | Lin et al. | |
| 7,509,277 B1* | 3/2009 | Gatto | 705/36 R |
| 2002/0040365 A1* | 4/2002 | Price et al. | 707/100 |
| 2002/0077946 A1* | 6/2002 | Caplan et al. | 705/36 |
| 2002/0099636 A1 | 7/2002 | Narumo | |
| 2003/0088489 A1 | 5/2003 | Peters et al. | |

OTHER PUBLICATIONS

"U.S. Appl. No. 09/739,565, Appeal Brief filed Feb. 28, 2007", 24 pgs.

"U.S. Appl. No. 09/739,565, Decision on Pre-Appeal Brief Request mailed Jan. 31, 2007", 2 pgs.

"U.S. Appl. No. 09/739,565, Final Office Action mailed Jun. 27, 2005", 11 pgs.

"U.S. Appl. No. 09/739,565, Final Office Action mailed Aug. 28, 2006", 11 pgs.

"U.S. Appl. No. 09/739,565, Non Final Office Action mailed Jan. 17, 2006", 10 pgs.

"U.S. Appl. No. 09/739,565, Non Final Office Action mailed Jul. 19, 2007", 13 pgs.

"U.S. Appl. No. 09/739,565, Non Final Office Action mailed Oct. 22, 2004", 11 pgs.

"U.S. Appl. No. 09/739,565, Notice of Allowance mailed Mar. 14, 2008.", 5 pgs.

"U.S. Appl. No. 09/739,565, Pre-Appeal Brief Request filed Oct. 30, 2006", 4 pgs.

"U.S. Appl. No. 09/739,565, Response filed Apr. 25, 2006 to Non Final Office Action mailed Jan. 17, 2006", 8 pgs.

"U.S. Appl. No. 09/739,565, Response filed Jul. 16, 2004 to Restriction Requirement mailed Jun. 29, 2004", 6 pgs.

"U.S. Appl. No. 09/739,565, Response filed Aug. 29, 2005 to Final Office Action mailed Jun. 27, 2005", 9 pgs.

"U.S. Appl. No. 09/739,565, Response filed Nov. 19, 2007 to Non-Final Office Action mailed Jul. 19, 2007", 13 pgs.

"U.S. Appl. No. 09/739,565, Restriction Requirement mailed Jun. 29, 2004", 5 pgs.

Brown, "Seven keys to a profitable investment club", Black Enterprise,29,7, (1999), 157(1).

Collins, et al., "Monitoring retirement portfolio sufficiency", Journal of Financial Planning, v10n1, (1997), 66-74.

Erdman, "What Newsletters can do for you", Fortune, v126n9, (1992), 95-102.

Rachlin, "Today's best investment advice", U.S. News & World report v104(22), (1988), 56(6).

* cited by examiner

US 8,401,948 B2

METHOD FOR IMPLEMENTING A VIRTUAL COMMUNITY OF INVESTORS HAVING INVESTMENT PORTFOLIOS

RELATED APPLICATIONS

This application is a continuation of U.S. patent application Ser. No. 09/739,565, entitled "ANALYTICAL TOOLS FOR A COMMUNITY OF INVESTORS HAVING INVESTMENT PORTFOLIOS", filed on Dec. 15, 2000, now U.S. Pat. No. 7,401,039 and which is incorporated herein in its entirety.

BACKGROUND

The long bull market of recent years has lead to a proliferation of on-line investors that are technologically savvy and able to avail themselves of vast research resources that the Internet provides. This proliferation has been reflected in increasing ranks of day traders and overall security volume attributable to non-institutional investors. Various web sites allow on-line investors to trade securities. Some web sites provide investors tools to monitor their holdings. These tools are typically a pie chart showing the sector breakdown of stock or mutual fund holdings, a simple graph showing the historical performance or price of stocks and mutual funds over a period of time, and a simple graph showing the increase in a hypothetical investment of $10,000 in one or more stocks or mutual funds. As more investors are endeavoring to control their own investments, new and better tools are needed to allow investors to understand the performance of their investments.

SUMMARY

A system and method for providing analytical tools for a community of investors having investment portfolios. A first tool provides an indication of a user's selection effectiveness regarding the user's choice of investments relative to those sectors in which the investment resides, and relative to a broader market. A second tool allows the user to evaluate the effectiveness of community stimuli on the user's portfolio. A third tool provides the user the capability to view relationships among a plurality of preferred analysts. With a fourth tool, a user may view a plurality of other analysts the user referred to the community.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

To increase a user's understanding of how a portfolio of investments or single investments are performing, and to provide other useful information a set of analytical tools may be provided to an investor. The investor may be an Internet investor that connects to a server running analyzer software that provides the analytical tools.

Figure 1:
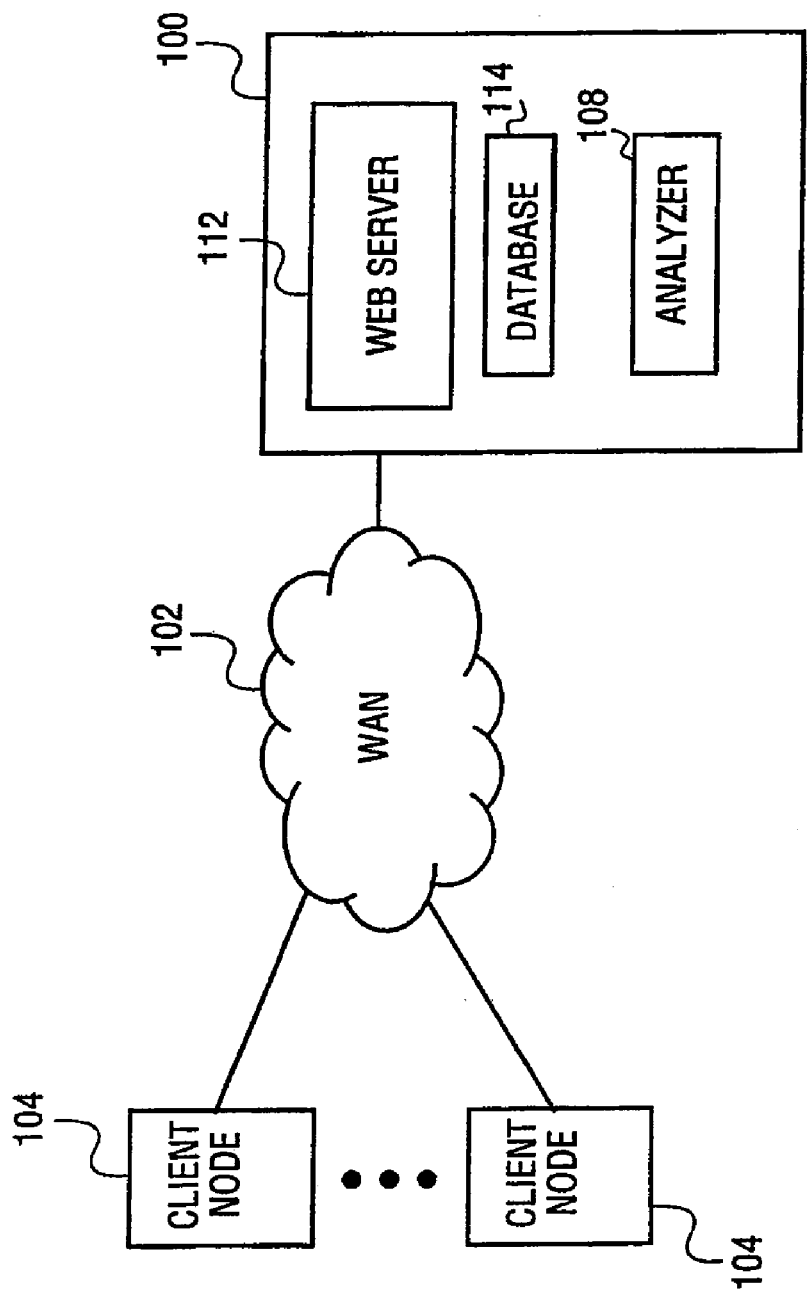
FIG. 1 is a block diagram of a system of one embodiment of the invention.

FIG. 1 is a block diagram of a system of one embodiment of the invention. A server node 100 is coupled to a wide area network (WAN) 102 such as the Internet. Also coupled to WAN 102 are a plurality of client nodes 104. Client nodes 104 may be a personal computer (PC), a WAN enabled phone, a personal digital assistant (PDA), a computer tablet, a set top box, or any other device with which a user may connect to a WAN. Server node 100 may include database 106 and analyzer 108. The server node 100 includes web server software 112 to serve web pages and information to, and to receive information from client nodes 104. The server node 100 receives information such as investment preferences, user profiles, real and virtual or hypothetical buy information, real and virtual or hypothetical sell information, referral information, and other information, including requests to view another user's investment preferences, submitted by a virtual community made of a population of users that connects from client nodes 104 through WAN 102 to the server node 100. The virtual community is based around investments, including securities investment, equities investment, etc.

Each member of the population that makes up the virtual community initially creates a personal profile and becomes a member of the community via server node 100. This may be achieved by the server node providing a web page or sequence of web pages in hypertext mark up language (HTML) that prompt the user to provide the appropriate information. Any references to prompting or providing web pages herein are achieved in this manner and may include a plurality of user interface items and user interface techniques, including, but limited to buttons, sliders, text entry fields, JAVA® applets, and the like.

Server node 100 may store personal profiles, community information, buy information, sell information, referral information, investor preferences, and a plurality of securities information and equities information in the database 106. Database 106 may be a relational database such as an Oracle-style database or may include one or more of such databases with or without links between them. To obtain values and other information concerning securities, equities, and other investments, server node 100 may communicate with third party databases (not shown) via WAN 102 or via a direct connection.

Users are referred to interchangeably herein as "analysts" and "members." Investments may include and may be referred to as securities, stocks, mutual funds, equities, and the like. In other embodiments, investments may also include any property, obligation, note, or ownership interest in anything. In one embodiment, the server node may provide for the formation of a mutual fund formed by screening the aggregation of member investment preferences. In this manner, a fund is established based on the intelligence of the community. Investment preferences are stocks or other investments the user prefers and actions the user wishes to have taken with regard to stocks or other investments such a buy, sell, hold, sell short, buy long, etc. Preferences may be thought of as recommendations for investing including associated actions to be taken concerning the particular investment.

In one embodiment, to encourage community members to submit their best investment preferences, a reward structure may be established to reward those members submitting the best performing investment preferences over a predetermined period of time such as daily, weekly or some other established time frame. In one embodiment, the reward structure further includes an incentive for referring members who subsequently are identified as having selected the best performing investment picks. To that end, the analyzer 108 may rank investment preferences submitted by each analyst to establish which analysts should receive the reward for each reward period. In one embodiment, the ranking is based on a comparison between the real world performance of all the analysts' preferences compared with the performance of all other analysts preferences during a particular time window. In this way, members may also be placed in a category of top performing investors. Analyzer 108 may also maintain a list of top performing investors made up of those investors whose preferences perform in a top range over a period of time. The range may be the top 1%, top 5%, top 10%, etc. The period of time may be quarterly, monthly, daily, weekly, past 30 days, past 60 days, etc.

In one embodiment, the server node includes analyzer software that provides the processing needed to achieve the analytical tools discussed below. The analyzer may interact with and communicate with one or more databases, one or more web servers, and other specialized servers (not shown) to provide web pages, receive and provide data, and provide graphics to achieve the analytical tools discussed below.

Figure 2A:
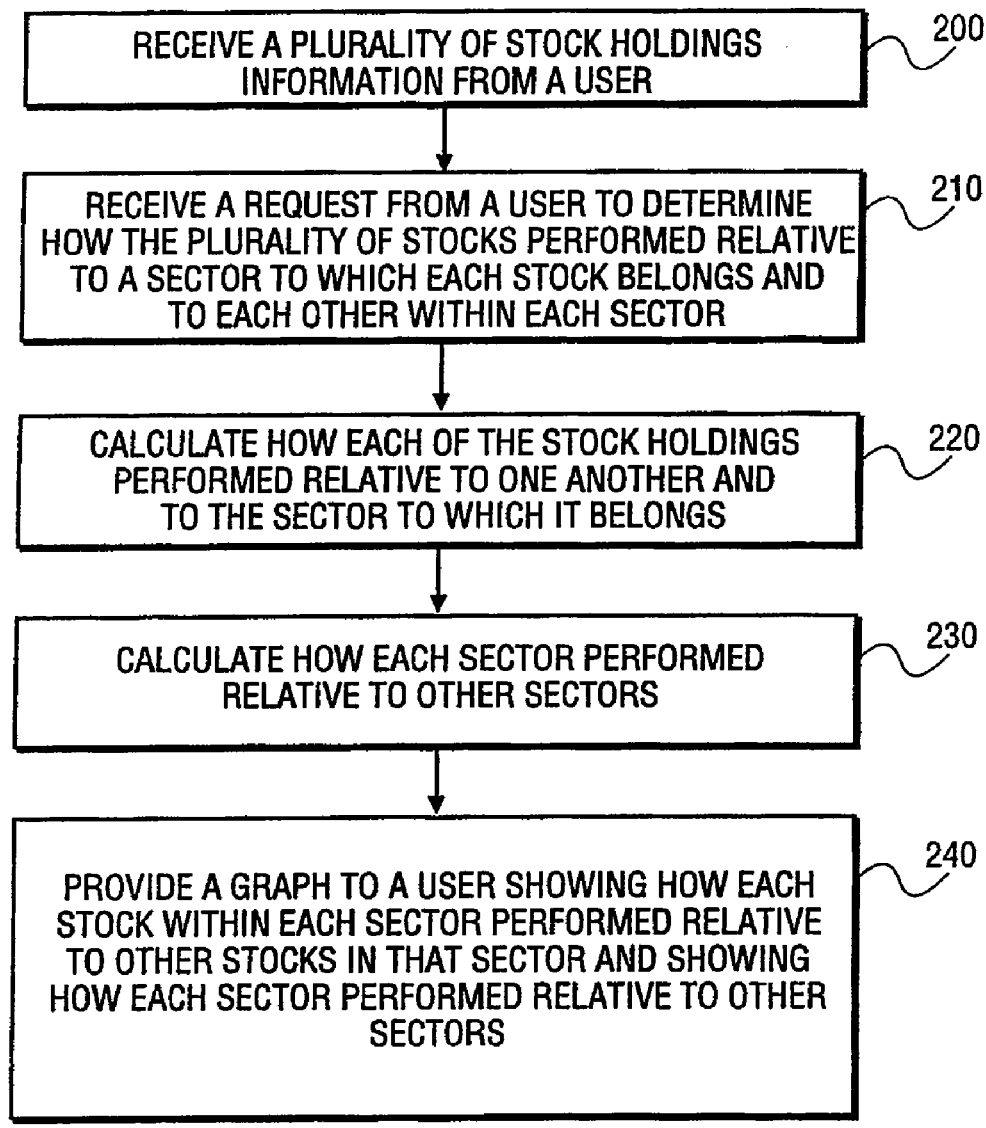
FIG. 2A is a flow diagram of operation of one embodiment of a tool to analyze the effectiveness of selecting investments relative to a sector and relative to a broader market according to an embodiment of the invention.

FIG. 2A is a flow diagram of operation of one embodiment of a tool to analyze the effectiveness of selecting investments relative to a sector and relative to a broader market according to an embodiment of the invention. The server receives a plurality of stock holdings and/or other investments from a user, as shown in block 200. The server may then receive a request from a user to determine how the plurality of stocks performed relative to a sector to which the stock belongs and relative to other stocks within the sector, as shown in block 210. Sectors may be well known categories of stocks, or any variety and granularity of categories that may be applied to the particular investment type or class. The server then calculates how each of the stock holdings performed relative to each other and relative to the sector to which the stock belongs, as shown in block 220. The server also calculates how each sector performed relative to other sectors, as shown in block 230. In one embodiment, the calculating in blocks 220 and 230 may be accomplished by the analyzer in the server. In this embodiment, all pertinent data may be obtained from third party databases and/or from the server's local database(s). In another embodiment, the server may serve an applet to the client (user) to do the calculating on the user's computer. In this embodiment, all pertinent data is maintained by and obtained from the user's computer.

The server then provides an indication of the user's effectiveness at choosing stocks within a sector and relative to a broader market by providing a graph to the user showing how each stock within each sector performed relative to other stocks in that sector and showing how each sector performed relative to other sectors, as shown in block 240. In another embodiment, the server may serve an applet to the client (user) to do display the graph on the user's computer. In one embodiment, the period of time for which these calculations are performed defaults to a server specified amount of time such as 30 days, 120 days, annually, etc. In another embodiment, the amount of time over which these calculations are made is user selectable. Sector performance may be computed according any well known methods.

Figure 2B:
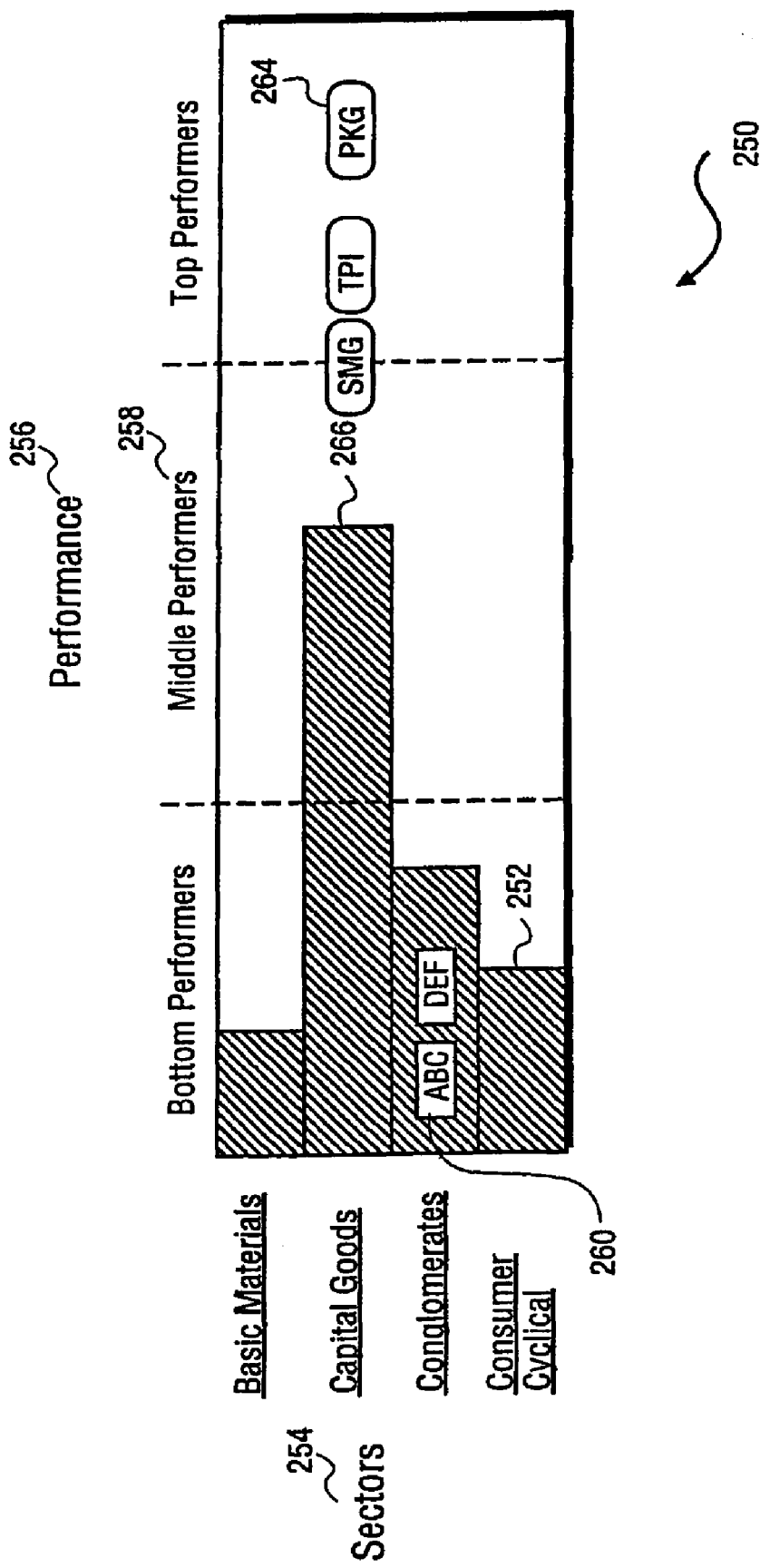
FIG. 2B is an embodiment of a graph indicating the effectiveness of selecting investments relative to a sector and relative to a broader market.

FIG. 2B is an embodiment of a graph indicating the effectiveness of selecting investments relative to a sector and relative to a broader market. In one embodiment, graph 250 is a horizontal bar graph that shows sectors 254 and their performance 256. In various embodiments, performance may be denoted by text labels such as the trio of bottom, middle and high performers; the sextet of poor, fair, average, good, better, best; etc. In other embodiments, performance may be denoted by a percentage change in share price, or a star rating such as from one star to five stars. As can be seen in graph 250, extremes are shown such as stock 260, a bad performer in the bottom sector, and stock, 264, a stock that outperformed other stocks in the sector and outperformed the sector. The graph also shows that sector 266 outperformed sector 252. This graph shows an investor the performance of the investor's stocks relative to the sector in which the stock is categorized, relative to other stocks within the sector, and relative to other of the investor's stocks in the investor's portfolio, and also shows the investor the performance of sectors relative to each other. The graph also provides the user an indication of how each particular stock in the portfolio performed relative the broader market by showing the performance of the various sector. In another embodiment, one or more well known indices such as the Russell 2000 or the Dow Jones Industrial Average may be provided for additional comparison. In one embodiment, inclusion of averages may be user selectable. In one embodiment, the user may select whether all sectors will be displayed or only those sectors in which the user has invested.

Figure 3A:
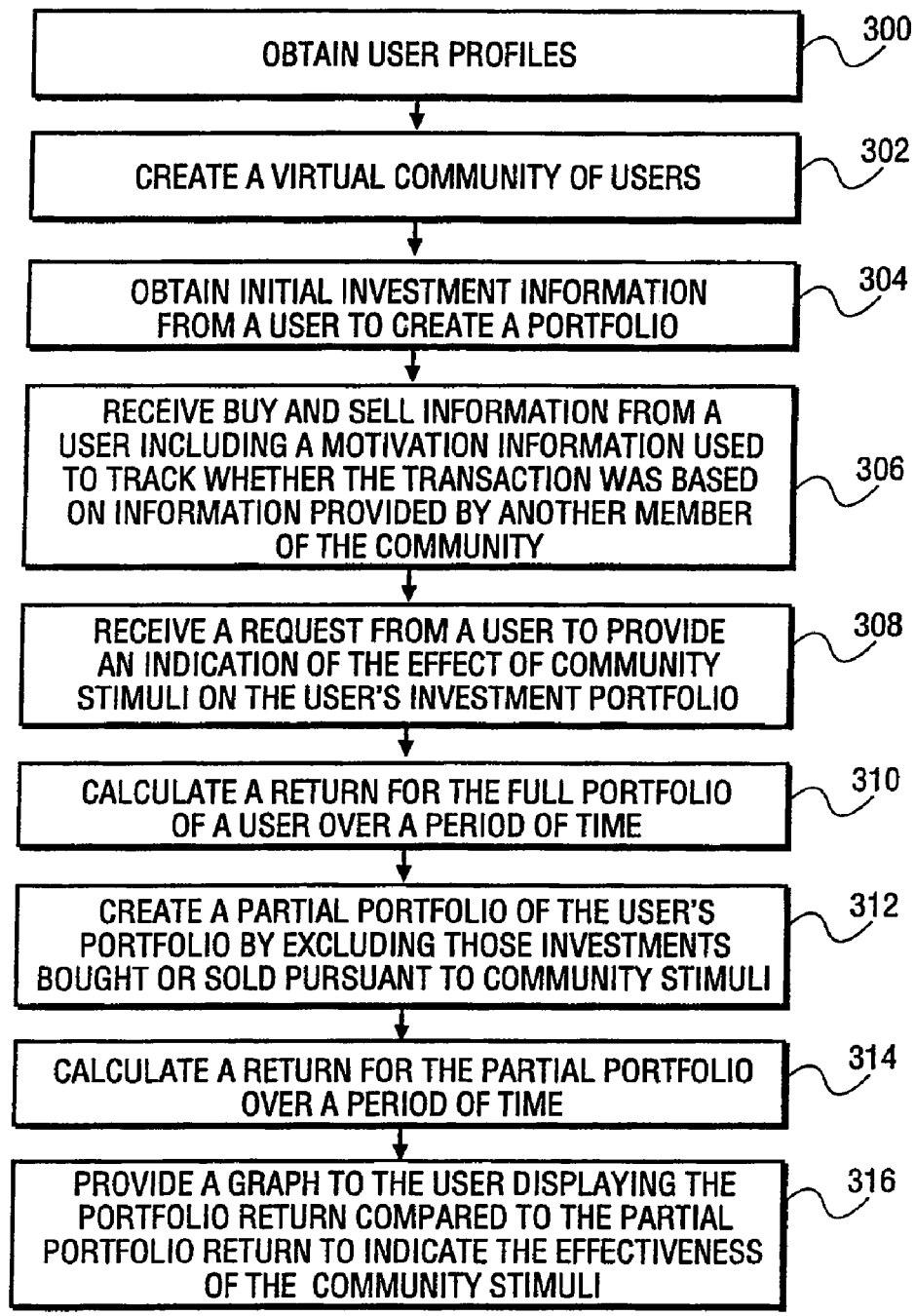
FIG. 3A is a flow diagram of operation of one embodiment of a tool to analyze the effectiveness of community stimuli in selecting investments according to an embodiment of the invention.

FIG. 3A is a flow diagram of operation of one embodiment of a tool to analyze the effectiveness of community stimuli in selecting investments according to an embodiment of the invention. The server first obtains user profiles, as shown in block 300, and creates a virtual community of users, as shown in block 302. The server then obtains initial investment information from a user to create a portfolio, as shown in block 304. This initial investment information may be a portfolio of securities or other investments designated by a ticker symbol, a purchase price, and may include a purchase date, a number of shares purchased, a commission paid and other information. In one embodiment, this initial investment information may include a motivation information by which a user specifies whether the purchase of the investment was made responsive to a community stimuli such as the preferences of a particular community member. The server then receives buy and sell information from a user including a motivation information used to track whether the transaction was based on information provided by another member of the community, as shown in block 306. h one embodiment, the motivation information may be inferred by the server such that the server may recognize when a user buys or sells a particular investment after viewing the preferences of another member regarding that investment. That is, in various embodiments, the motivation information may be server determined or provided by a user.

The server may receive a request from a user to provide an indication of the effect of community stimuli on the user's investment portfolio, as shown in block 308. The server then calculates a return for the user's investment over a period of time, as shown in block 310. The server then creates a partial portfolio of the user's portfolio by excluding those investment bought or sold pursuant to community stimuli, as shown in block 312. The server calculates a return for the partial portfolio over a period of time, as shown in block 314. The server then provides a graph to the user showing the portfolio return compared to the partial portfolio return over a period of time to indicate the effectiveness of community stimuli on the investor's portfolio, as shown in block 316.

Figure 3B:
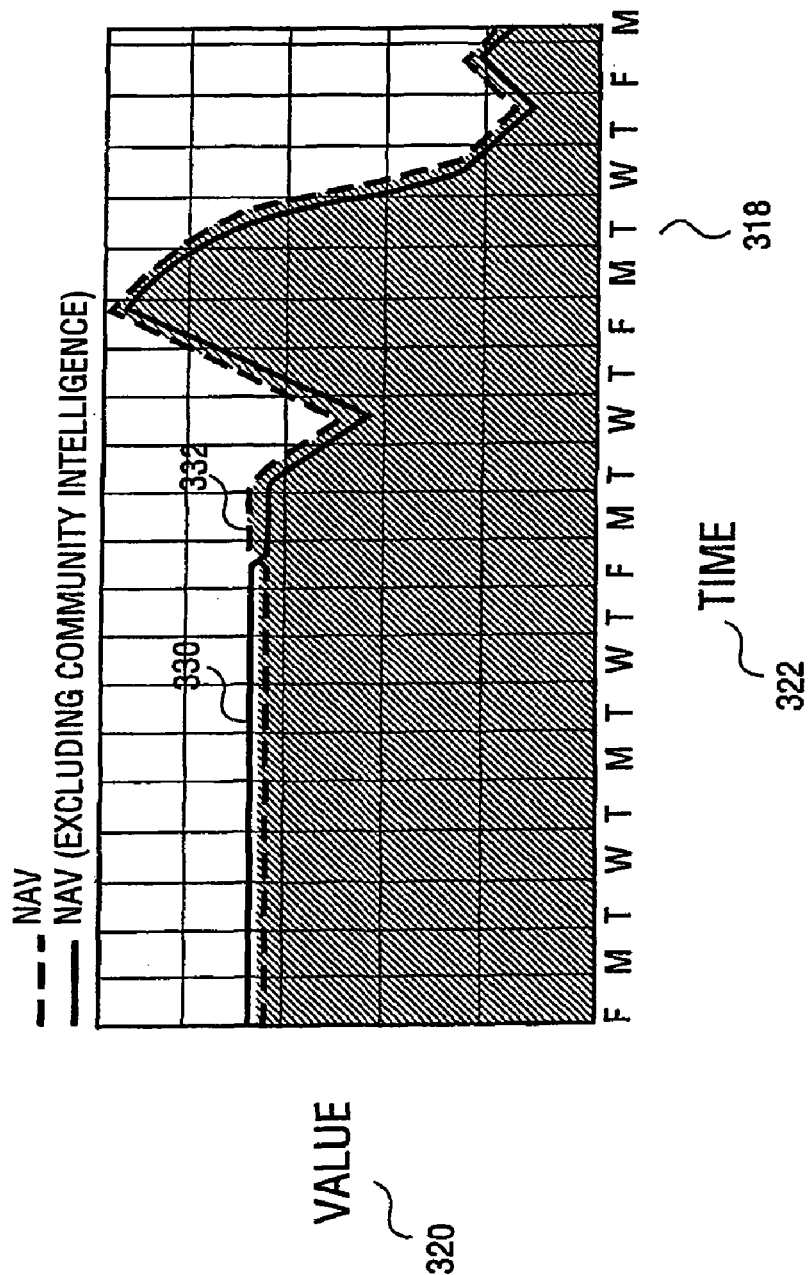
FIG. 3B is an embodiment of a graph indicating the effectiveness of community stimuli in selecting investments.

FIG. 3B is an embodiment of a graph indicating the effectiveness of community stimuli in selecting investments. Graph 318 depicts the net asset value 320 of a portfolio of securities over a period of time 322. A first line 330 indicates the value of the user's portfolio, and a second line 332 indicates the value of a subset of the user's portfolio excluding those investments made based on community stimuli. In this way, the user may easily see whether the performance of the user's portfolio has been enhanced or degraded by the inclusion of investments made pursuant to community stimuli.

Figure 4A:
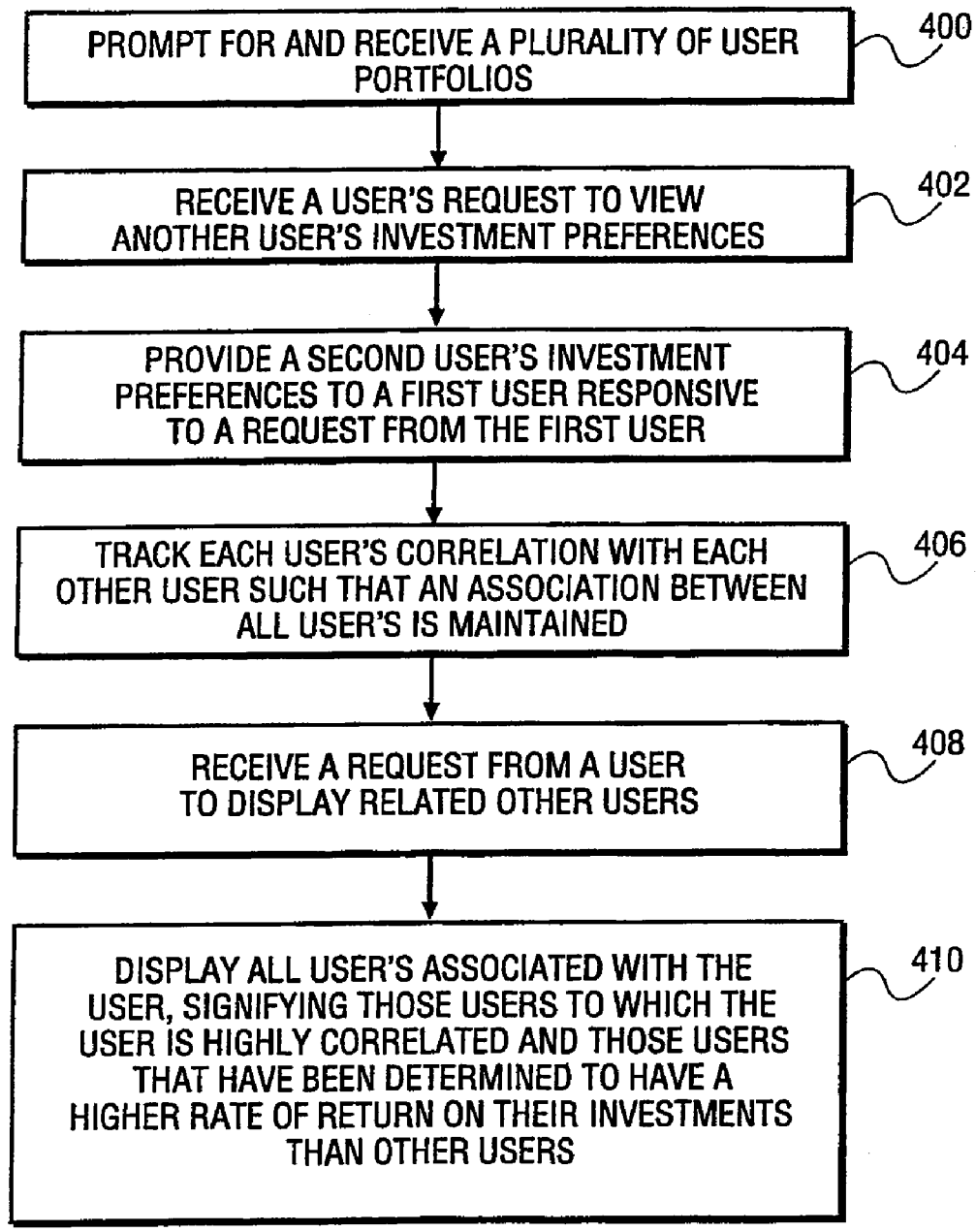
FIG. 4A is a flow diagram of operation of one embodiment of a tool to analyze the relationship between investors in a community of investors according to an embodiment of the invention.

FIG. 4A is a flow diagram of operation of one embodiment of a tool to analyze the relationship between investors in a community of investors according to an embodiment of the invention. After prompting for and receiving a plurality of user profiles, as shown in block 400, the server may receive a user's request to view another user's investment preferences, as shown in block 402. The server then provides a second user's investment preferences to the first user responsive to receiving the request from the first user, as shown in block 404. The server tracks each user's correlation with each other user such that an association between all user's is maintained, as shown in block 406. In one embodiment, this association may be server determined by the server maintaining a list of the users whose preferences a user visits. In another embodiment, the association may be maintained only if the user bases a trade on another user's preferences. In yet another embodiment, a user may be provided the ability to add other investors to a list of favorite investors which is maintained by the server. In this way, the association is based in the user selected favorites list.

The server may then receive a request from a user to display related other users, as shown in block 408. In one embodiment, the user may select a degree of relationship so that only users within that degree of relationship will be displayed. In another embodiment, the server has a predefined degree of relationship that will limit the display. The server then displays user's associated with the user, as shown in block 410. In the display, the serve may signify those users to which the user is highly correlated and those users that have been determined to have a higher rate of their return on investments than other users. In one embodiment, the server may allow the user to view the relationship between any one user and all other users, within a degree of relationship.

Figure 4B:
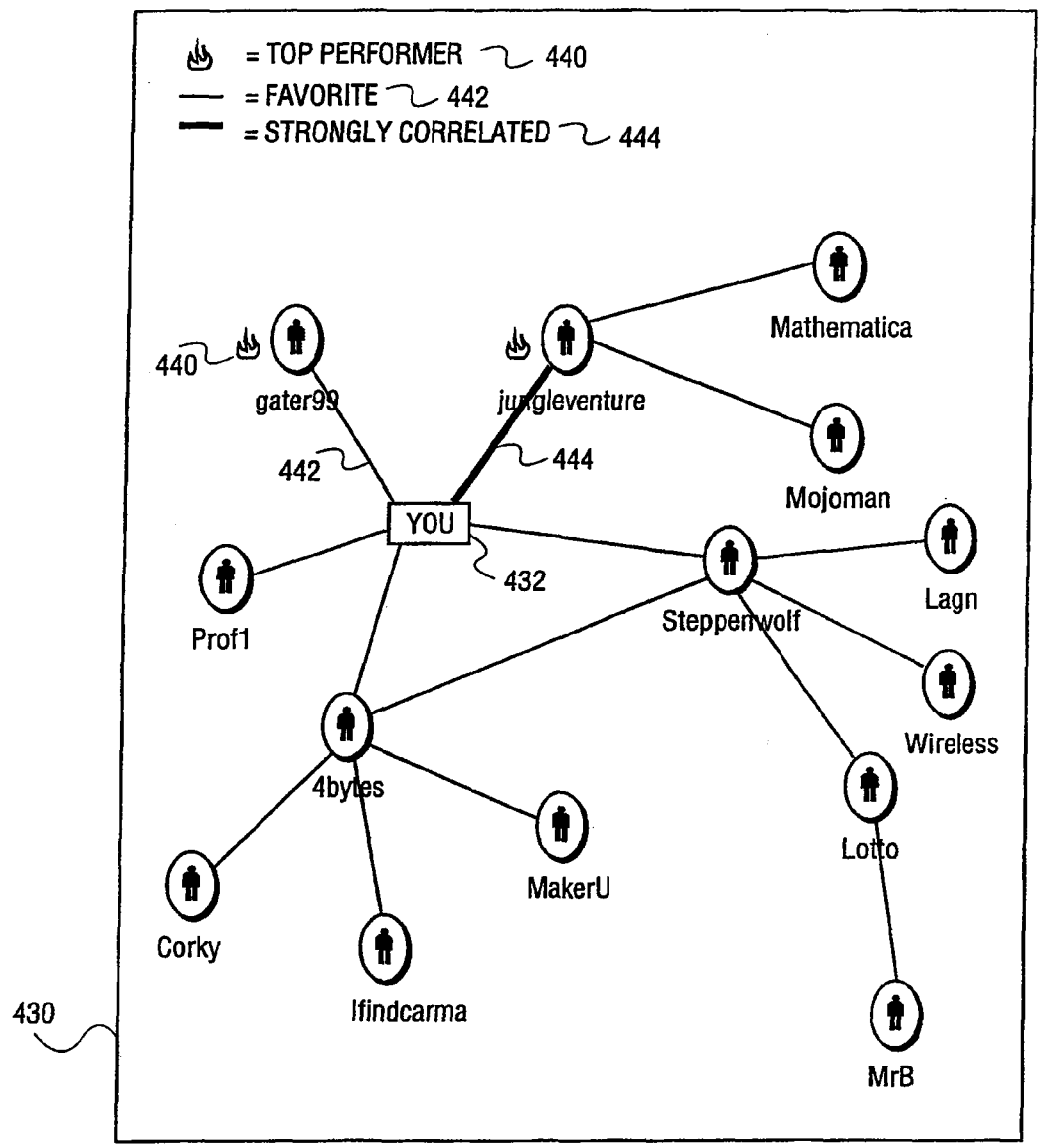
FIG. 4B is an embodiment of a graph indicating the relationship between investors in a community of investors.

FIG. 4B is an embodiment of a graph indicating the relationship between investors in a community of investors. Graph 430 shows the association between a user 432 and other users based on the association maintained by the server. In one embodiment, related users are denoted by a first style of line such as line 442, and highly related users are denoted by a second style of line such as line 444. In one embodiment, those users who are top performers may be denoted as such by a graphical accent such as a flame 440. The result is what may be considered a constellation. The example depicted in graph 430 is limited to three levels of relatedness. In various embodiments, the levels or degrees of relatedness displayed may be system dependent or user selectable. In one embodiment, the graph represents the user's favorite other users and their favorites' favorites, etc. In this embodiment, an indication of whether the user's investing style is highly related may also be presented. In another embodiment, the graph may also indicate those user's to whom the user's investing style is related or highly related. In one embodiment, a user may view the degree of relationship of one user to all other users by clicking on the particular user displayed in the constellation, such as, for example, clicking on any user in graph 430 may cause a relationship graph of the particular user to be displayed.

Figure 5A:
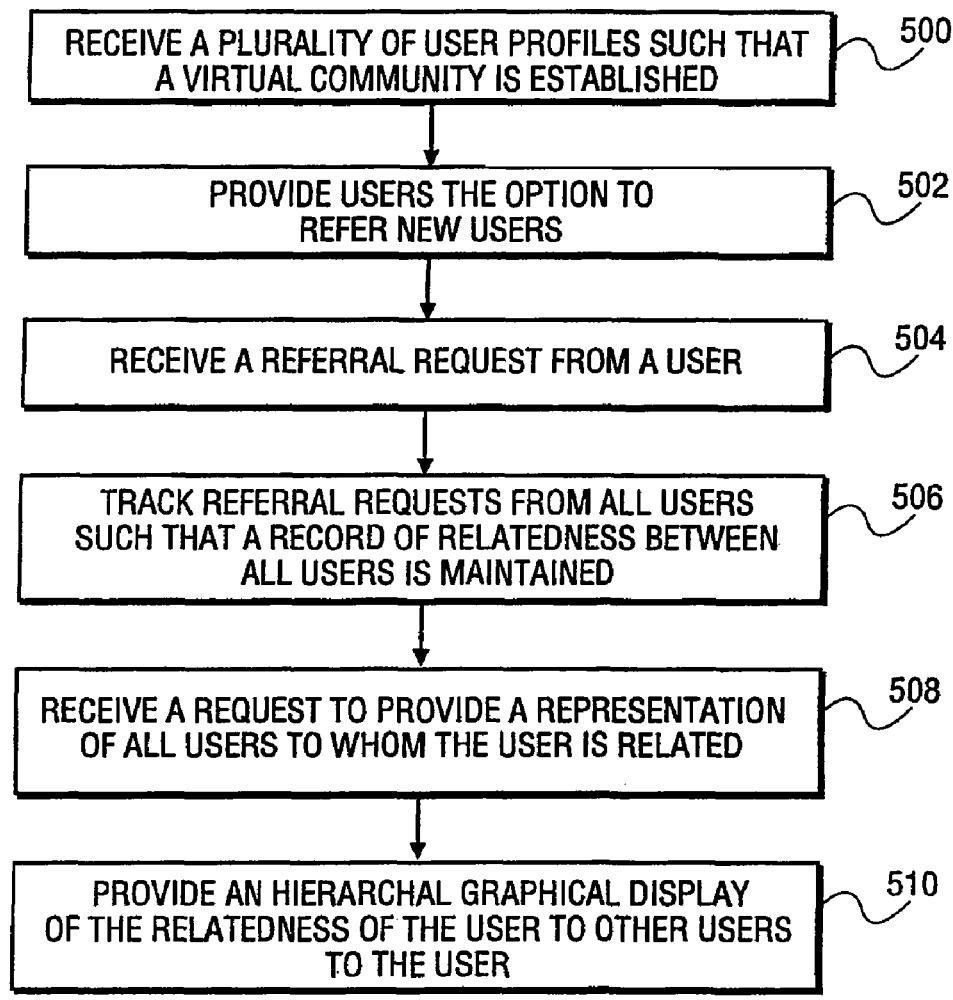
FIG. 5A is a flow diagram of operation of one embodiment of a tool to analyze the referral relationship between investors in a community of investors according to an embodiment of the invention.

FIG. 5A is a flow diagram of operation of one embodiment of a tool to analyze the referral relationship between investors in a community of investors according to an embodiment of the invention. After prompting for and receiving a plurality of user profiles such that a virtual community is established, as shown in block 500, the server may provide the user the option to refer new users to become members of the virtual community, as shown in block 502. The server then receives this referral request from the user, as shown in block 504. The server may then take appropriate action to respond to the referral request. The server tracks referral requests from all users such that a record of relatedness between all users is maintained, as shown in block 506. The server may receive a request to provide a representation of all users to whom the user is related, as shown in block 508. In response, the server provides an hierarchical graphical display of the relatedness of the user to other users to the user, as shown in block 510.

Figure 5B:
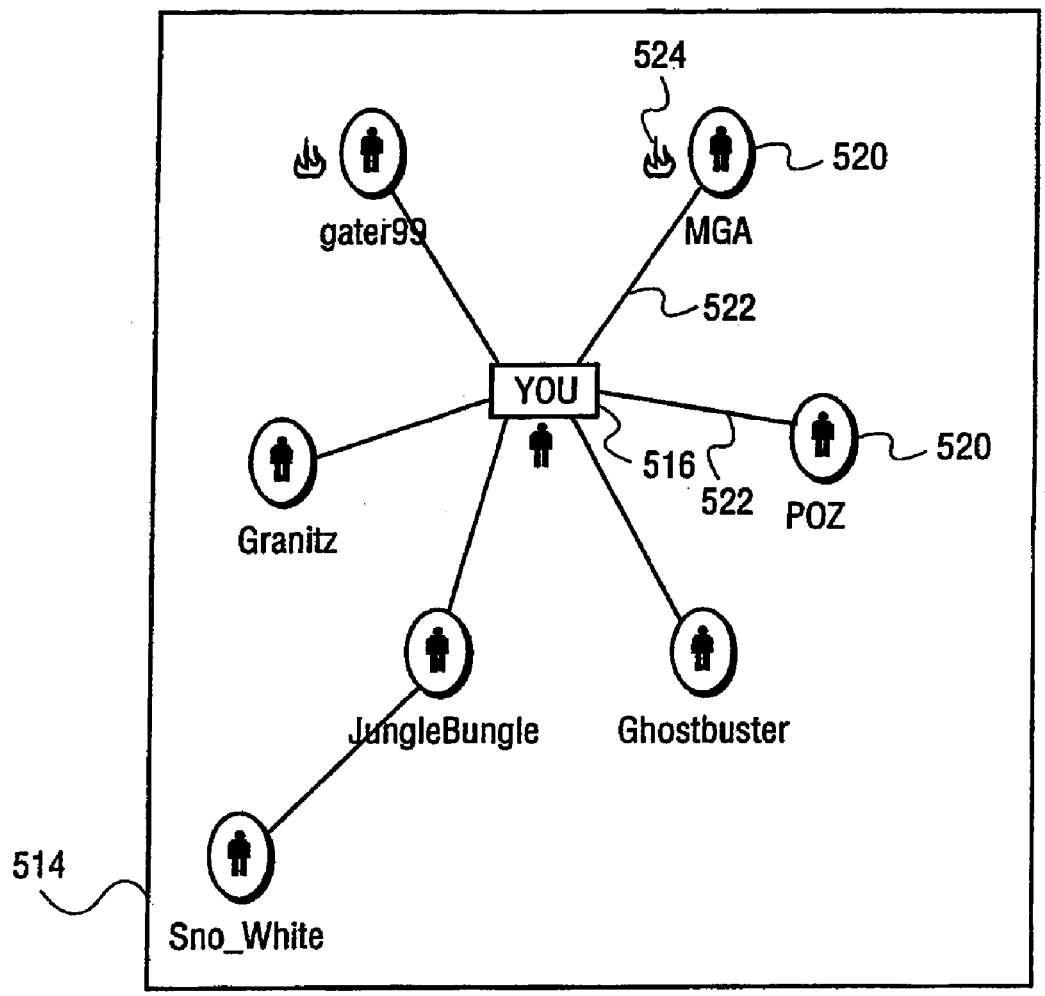
FIG. 5B is an embodiment of a graph indicating the referral relationship between investors in a community of investors.

FIG. 5B is an embodiment of a graph indicating the referral relationship between investors in a community of investors. Graph 514 shows the association between a user 516 and other users based on the hierarchical record maintained by the server. Related users are denoted by a line such as line 522. User 516 is shown to be related to various other users 520 via lines 522. In one embodiment, those users that are top performers may be denoted as such by a graphical accent such as a flame 524. The result is what may be considered a constellation. The example depicted in graph 514 is limited to two levels of relatedness. In various embodiments, the levels or degrees of relatedness displayed may be system dependent or user selectable.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer-implemented method comprising:
   determining, using a processor, a relationship between a first community member of a plurality of virtual community members and a second community member of the plurality of virtual community members, the relationship identifying an action that the first community member performed with respect to the second community member; and
   displaying a visual representation of the relationship between the first community member and the second community member.

2. The computer-implemented method as set forth in claim 1, wherein the action is a viewing by the first community member of a preference of the second community member.

3. The computer-implemented method as set forth in claim 1, wherein the action is a selecting by the first community member of the second community member as a favorite community member.

4. The computer-implemented method as set forth in claim 1, wherein the action is a specifying by the first community member that a transaction performed by the first community member was based on a preference of the second community member.

5. The computer-implemented method as set forth in claim 1, wherein the displaying of the visual representation of the relationship between the first community member and the second community member comprises displaying a graphical accent near a visual representation of the second community member based on the second community member being a top performer among the plurality of virtual community members.

6. The computer-implemented method as set forth in claim 1, wherein the action is a referring by the first community member of the second community members as a new community member of the plurality of virtual community members.

7. The computer-implemented method as set forth in claim 1, wherein the relationship between the first community member and the second community member is an indirect relationship.

8. The computer-implemented method as set forth in claim 2, wherein the preference comprises an investment preference.

9. The computer-implemented method as set forth in claim 1, wherein the relationship comprises a level of relatedness and the displaying of the visual representation of the relationship includes depicting the level of relatedness.

10. A non-transitory computer-readable medium comprising a set of instructions that, when executed by at least one processor of a computer system, cause the computer system to perform operations comprising:
   determining a relationship between a first community member of a plurality of virtual community members and a second community member of the plurality of virtual community members, the relationship identifying an action that the first community member performed with respect to the second community member; and
   displaying a visual representation of the relationship between the first community member and the second community member.

11. The non-transitory computer-readable medium as set forth in claim 10, wherein the action is a viewing by the first community member of a preference of the second community member.

12. The non-transitory computer-readable medium as set forth in claim 10, wherein the the action is a selecting by the first community member of the second community member as a favorite community member.

13. The non-transitory computer-readable medium as set forth in claim 10, wherein the action is a specifying by the first community member that a transaction performed by the first community member was based on a preference of the second community member.

14. The non-transitory computer-readable medium as set forth in claim 10, wherein the displaying of the visual representation of the relationship comprises displaying a graphical accent near a visual representation of the second community member based on the second community member being a top performer among the plurality of virtual community members.

15. The non-transitory computer-readable medium as set forth in claim 10, wherein the action is a referring by the first community member of the second community member as a new community member of the plurality of virtual community members.

16. The non-transitory computer-readable medium as set forth in claim 10, wherein the relationship comprises an indirect relationship between the first community member and the second community member.

17. The non-transitory computer-readable medium as set forth in claim 10, wherein the preference comprises an investment preference.

18. The non-transitory computer-readable medium as set forth in claim 10, wherein the relationship comprises a level of relatedness and the displaying of the visual representation of the relationship includes depicting the level of relatedness.

19. The method of claim 1, wherein the displaying of the visual representation includes displaying a visual representation of a subset of the plurality of virtual community members as a plurality of nodes and displaying a visual representation of the relationship using a graphical element to connect a node of the plurality of nodes corresponding to the first virtual community member with a node of the plurality of nodes corresponding to the second community member.

20. The method of claim 19, further comprising selecting the based on a degree of relatedness between the first community member and each member of the subset.

* * * * *